March 1, 1932.  A. O. AUSTIN  1,848,071
TRANSMISSION LINE
Original Filed May 27, 1927  6 Sheets-Sheet 1

INVENTOR
Arthur O. Austin
BY Nissen Crane
ATTORNEYS

March 1, 1932.  A. O. AUSTIN  1,848,071

TRANSMISSION LINE

Original Filed May 27, 1927   6 Sheets-Sheet 2

INVENTOR
BY Arthur O. Austin
Nissen & Crane
ATTORNEYS

March 1, 1932.  A. O. AUSTIN  1,848,071
TRANSMISSION LINE
Original Filed May 27, 1927  6 Sheets-Sheet 4

Fig. 8

INVENTOR
Arthur O. Austin
BY Nissen & Crane
ATTORNEYS

March 1, 1932. A. O. AUSTIN 1,848,071
TRANSMISSION LINE
Original Filed May 27, 1927   6 Sheets-Sheet 6

INVENTOR
Arthur O. Austin
BY Nissen & Crane
ATTORNEYS

Patented Mar. 1, 1932

1,848,071

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION LINE

Application filed May 27, 1927, Serial No. 194,607. Renewed January 14, 1932.

This invention relates to high potential transmission lines and has for one object the provision of means for keeping down voltages induced in this transmission conductor by external disturbances and also for raising the voltage at which flash-over to ground will occur. Other objects and advantages will appear from the following description and claims. The invention is exemplified in the combination and arrangement of parts shown in the accompanying drawings and described in the following specification and it is more particularly pointed out in the appended claims.

The economical construction of transmission lines where reliability is an important consideration is exceedingly difficult where the lines traverse a district subject to lightning or where a high transient potential is likely to be induced upon the conductors. Lightning may easily set up stresses which would cause flash-over of even exceedingly large insulators. Large insulators in turn require greater tower clearances, and the greater tower clearance in turn tends to increase the mechanical stresses imposed by the conductors and greatly increases the cost of the supporting structures. The increased clearance between conductors while tending to reduce the corona voltage, increases the line reactance and tends to increase the cost of the system as a whole for a given amount of power transmitted.

In my improved line construction, the conditions are greatly improved which will result in material reduction, if not the complete elimination of flash-overs or arcs from conductor to ground on many systems. The improved construction is particularly applicable to new lines and may be applied to many old lines at comparatively slight additional expense. The invention permits of a much closer spacing of conductors than is possible in constructions where all dependence must be placed on the insulator itself for providing resistance to flash-over. This closer spacing has many economic advantages resulting in supporting structures of lower cost and better regulation on the line, and since the spacing of the conductors may be reduced, the maximum height of the conductor supports and consequently induced voltage due to atmospheric changes may be kept down, particularly for multiple circuit towers.

In transmission operation the voltage induced by lightning is usually the determining factor in causing flash-overs as the induced voltage is likely to be many times the flash-over the insulator will carry. By far the greatest number of exceedingly high voltages produced on the line are caused by the release of a bound charge in the line which occurs where a charged cloud over or near the transmission line discharges to ground or to an adjacent cloud. For mechanical and electrical reasons and in order to provide safe clearances, it is necessary to install transmission conductors at some distance above the ground. Where the clearance between conductors remains the same, the charge induced upon a conductor by a charged cloud will tend to increase approximately as the height of the conductor above the earth's surface. The closer the conductors are together, the less will be the bound charge on each, other conditions being the same. Upon the release of a bound charge the voltage will rise on the conductor in accordance with the electrostatic laws.

If Q represents the bound charge for any conductor, the voltage rise when this charge is released will be determined by the effective electrostatic capacity of this conductor to ground or objects of lower potential. A comparatively small charge will produce a high potential if the electrostatic capacity of the conductor to ground or to the other conductors of lower potential is small, as the potential is directly proportional to the charge and inversely proportional to the electrostatic capacity. In order to keep the induced voltage or potential as low as possible, it is not only advisable to keep down the bound charge, but it is equally important to increase the effective electrostatic capacity of the conductor to ground or to objects of lower potential. By keeping the rise in potential down, it may be possible to prevent a discharge from conductor to ground over the insulator or from conductor to the supporting structure. It is evident that the above applies equally well to whether a positive or negative charge is released on the conductor.

The amount of energy which can be stored in a condenser increases as the square of the potential or voltage. It is therefore important that a high voltage be used if possible where considerable energy is to be stored. Where a high voltage or potential can be impressed upon the conductor, brush discharge will increase its effective size and capacity to ground or conductors of lower potential and also tend to dissipate the charge. Many transmission lines equipped with ground or static wires cannot make use of a high voltage between the conductors and ground or static wire owing to the fact that flash-over to ground will limit the stored energy. Raising the flashing potential between conductor and ground will make it possible to store more energy and thereby reduce the possibility of an interruption due to flash-over.

In my improved transmission line it is possible to place very much higher potentials upon the conductors and thereby take advantage of the largest amount of energy which may be stored without causing flash-over from conductors to ground. Since it is not necessary to provide all the insulation in the insulator itself, the conductors may be brought nearer together. This, as stated above, tends to reduce the bound charge on any individual conductor, makes it possible to operate some of the conductors at a lower height, which, in turn, tends to keep down the bound charge and, in addition, the lower height of the conductors means greater effective capacity to ground, all of which tends to keep down the maximum induced potential. These advantages, as well as the elimination of flash-overs on existing lines, better regulation, lower cost of structures and narrower rights of way, all make the improved construction of great economic importance.

There are several methods of carrying out the principles of the invention which, while appearing different upon the surface, are in effect the same as to essentials.

Figure 1:
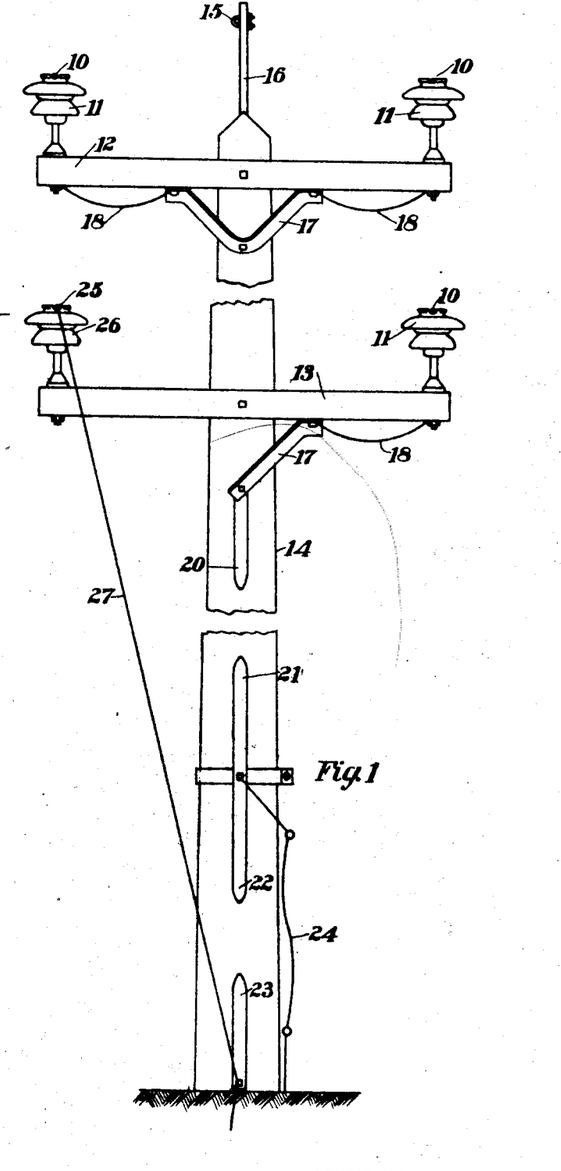
Fig. 1 is an elevation of a conductor support illustrating one embodiment of the present invention.
Figure 2:
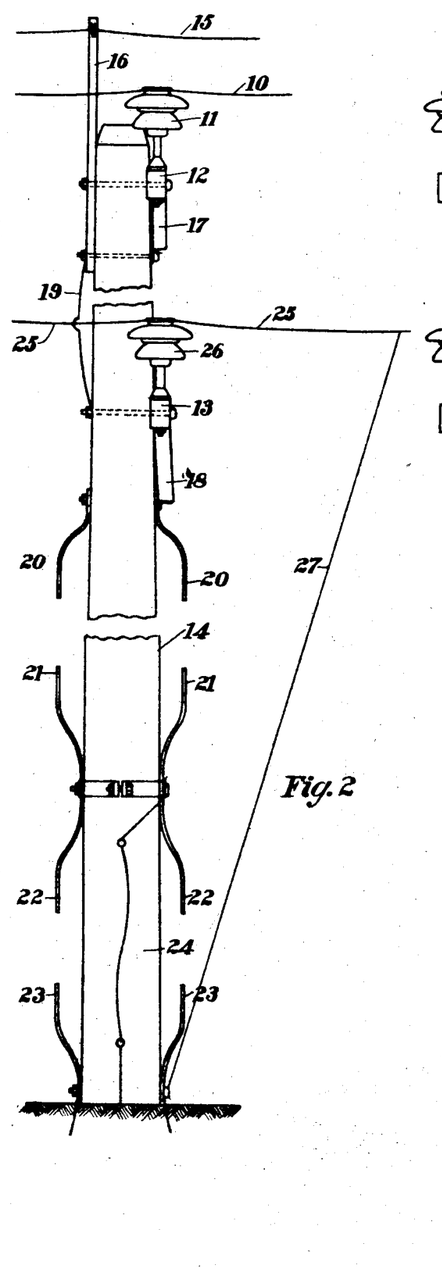
Fig. 2 is an elevation at right angles to Fig. 1.

In the construction shown in Figs. 1 and 2, the power conductors 10 are supported on insulators 11, which, in turn, are mounted on cross arms 12 and 13. The cross arms 12 and 13 are mounted on a wood pole 14. In addition to the power conductors, a conductor 15, which I shall call a charging or counter potential wire, is mounted on a bayonet 16. This conductor 15 may be at, above, or below the level of the power conductors 10 depending upon the electrical conditions which it is desired to set up. The conductor 15 is preferably tied into the metal braces 17 and bolts 18 connecting the insulator pins to the braces, to lead 19, and to the gap members 20. The conductor 15 is connected to ground through a high resistance or a reactance connected to earth at various points along the line. In general, however, the conductor 15 need have no direct ground connection on many systems, its potential being established by leakage over the supporting structure. One method is to connect the charging or counter potential wire 15 to ground through a circuit breaker or reactance at the end of the line. In case an arc picks up between the line conductor and the metal supporting work electrically connected to the conductor 15, the arc may be interrupted through the functioning of the reactance as in the case of a Peterson coil or by the opening of the circuit breaker. A suitable circuit breaker or fuse may be effective in clearing the arc on shorter lines where the charging current is not too high. This type of construction lends itself to another method of treatment of eliminating an arc between conductor and supporting structure tied into the charging wire such as the Nicholson arcing ground suppresser where the conductor and charging wire would be electrically tied together by suitable means momentarily and then opened through a circuit breaker. Establishing the same potential between conductor and charging wire will eliminate the arc which could then be opened by the circuit breaker.

Figure 5:
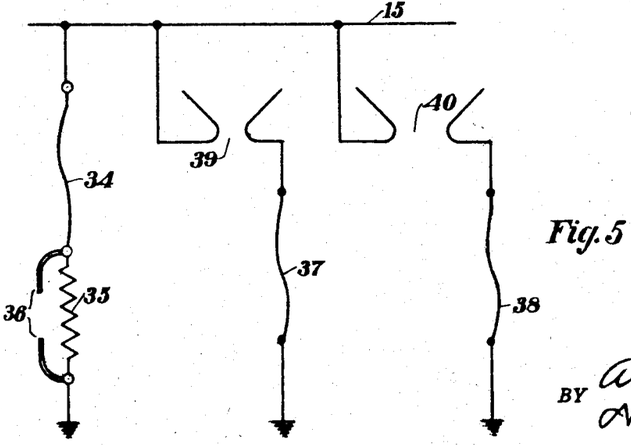
Fig. 5 is a diagrammatic figure showing different connections between the charging or counter potential wire and ground.

In very long lines it may be preferable to break up the line into sections in order that the charging current between conductor 15 and the power conductors be so reduced that the arc may be readily opened by a circuit breaker or a system of fuses shown in Fig. 5. Any suitable form of fuse or magazine of fuses may be substituted for the circuit breaker if desired. Where multiple fuses are used, it is desirable to insert a gap in all fuses other than the first one connected to the line. This permits of the clearing of the line and the utilization of the other fuses where discharges occur in rapid succession, as in this case it may be impossible to replace the first fuse before a second discharge takes place. The charging current between conductor and charging wire 15 may be utilized for clearing the arc as in the case of the Peterson coil. The charging wire 15 permits carrying off any unbalanced leakage or charging current so that the burning of the structure will be prevented due to the leakage of current at normal frequency. The burning of the structure will also be prevented in case of the flash-over of the insulator where the charging conductor is connected to ground.

In operation the charging or counter potential wire may be regarded as performing two distinct electrostatic functions. Owing to its relative position and due to the effect it will have on ground potential due to leakage to ground or its connection at the end of the line, it will tend to reduce the bound charge on the power conductors 10. Upon the discharge of a cloud, the bound charge will produce a rise in potential not only in conductors 10, but also in the charging conductor 15. Since the bound charge released upon the conductor and upon the charging wire is of the same potential, the charge released on the charging wire will tend to raise the potential of the supporting structure electrically connected to this charging wire and insulated from ground. This rise in potential of the supporting structure adjacent to the insulators supporting the power conductors will reduce the momentarily induced voltage upon the insulators by an amount equal to the rise in potential of the supporting structure charged by the counter potential wire. The amount of this rise in potential will depend upon the charge on the conducting wire and upon the effective capacity of this conductor and supporting structure to ground. The amount of the charge may be controlled by the height, size, or location of the charging wire or effective capacity of the insulated section of the supporting structure to ground. In order that the charge on the conductor 15 may be utilized to raise the potential of the supporting structure, it is necessary that the charge be prevented from flowing to ground over the pole. In order that this may be accomplished, an ungrounded section of the pole is utilized below the lowest conducting support. In case of excessively high stresses set up, it may be impossible to prevent a discharge over this section and in order to prevent burning or shattering of the pole, a screen or shielding type of discharge gap permits discharge to points 20 and 21 and then through the fuse 24 or points 22 and 23 if the fuse is blown. A single gap or a series of gaps may be utilized depending upon conditions and results desired. Where a series of gaps is used, one or more of the gaps may be shunted with a fuse 24 which will clear the arc after discharge has taken place. In general, a high frequency discharge will not blow the fuse, but a power arc following will blow the fuse, which, in general, will clear the line of the ground.

Where wood structures are used, much effective insulation may be provided between the portion charged by the charging or counter potential wire 15 so that great care in the location of the charging wire is not necessary. Where the insulating zone of the supporting structure is restricted, however, it is essential that the charging wire be so located that the insulation of the insulator supporting the conductors be effectively utilized as well as the drop in potential across the insulating section. An example in this connection will illustrate the application. An insulator having an effective flash-over under the release of a bound charge of 200 K. V. will provide a flashing potential of only 200 K. V. when mounted on a grounded structure. If an ordinary ground wire is used which reduces the effective potential 40%, the field set up by the cloud may be increased 66⅔% before reaching 200 K. V. on the insulator, or, in other words, the effect of the ground wire as compared to the line without the ground wire would be to increase the flashing potential of the insulator from 200 K. V. to 333 K. V. If, however, a section of the pole is utilized which is equivalent to a flashing potential of 600 K. V., a very high effective insulation may be obtained to withstand the released charge. If the charging wire is so placed that the 600 K. V. effective insulation of the supporting structure is utilized at the same time as the 200 K. V. flashing potential of the insulator, a total effective insulation or flash-over of 800 K. V., the sum of the two, will result. If, however, the counter potential wire is so located that the potential of the supporting structure will be raised to the same potential as the power conductor, there would be no abnormal potential across the insulator and the total flash-over of the two would be reduced by the amount of potential which could be carried by the insulator or the resulting effective flash-over of the structure will be 600 K. V. in place of 800 K. V. If the charging conductor reaches the potential of the supporting structure so that the difference in potential between the supporting structure and the power conductor will exceed the flash-over potential of the insulator, a discharge will take place between the two. It is therefore important that the potential of the supporting structure be such that the difference in potential between the supporting structure and the power conductor does not exceed the flashing potential of the insulator to obtain the best results. It is evident where the counter potential wire can be utilized to control the potential of the supporting structure immediately adjacent the insulators all stress induced by lightning may be counteracted so that the tendency of the insulator to flash under the surge will be negligible providing sufficient insulation can be furnished by the supporting structure.

Where extreme conditions are encountered, this potential may be added to that of the insulator, greatly increasing the effective flash-over between conductor and ground. Since the stored energy will increase as the square of the voltage or potential, the increase in potential of the conductors above ground before flashing will permit of the momentary storing of the released charge which might otherwise cause flash-over. This charge is readily dissipated as it goes out along the line and is absorbed by the losses and capacity so that it is necessary to provide for an excessively high potential for an exceedingly short space of time only, under which conditions, wood and many other materials may act as effective insulators, providing suitable insulators are provided which will withstand continuous normal frequency potential.

It is possible to so construct the charging conductor 15 that the charge will flow away at approximately the same rate on this conductor as that on the power conductors so that the relative difference in potential over the insulator and between the insulated section and ground will be approximately the same until the potential is reduced to a point where there is no danger of the flashing of the insulator. Since the attenuation of the voltage is very rapid where the charge travels away from the point of maximum potential, great care in providing a careful relation is not essential to successful operation. Since the potential of the conductors insulated from the ground will be determined by their relative electrostatic capacity to ground and the charge upon them, a further reduction in potential may be effected by bringing a conductor with a ground potential near the transmission conductors. This, however, should not be accomplished at the expense of lowering the flash-over voltage between conductor and ground. Otherwise, the danger of flash-over may actually be increased rather than reduced.

One method of accomplishing this is to use an insulated ground wire 25 mounted on an insulator 26 and connected to ground through a lead 27. The insulation furnished by the arm 13 and the insulator 26 should be equivalent to the insulated zone of the supporting structure to develop the full possibilities of the charging wire 15. Since there is no normal voltage arcing across insulator 26, this insulator may be mounted on a wood pin of good length if so desired to further increase the flash-over of the combination. One method of attaching the ground to conductor 25 is to attach a jumper 27 at some distance out on the transmission conductor bringing the jumper down at an angle to the pole and attaching it near the base of same. This jumper or down lead should be carried to ground in such a way that it will not eliminate the insulation of the pole. The ground wire 25 tends to function similarly to the usual ground wire with the exception that the insulation of the pole is not eliminated, and, since a much higher potential may exist between the conductors and ground wire before flash-over will occur, the stored energy can be greatly increased over the usual application of the ground wire. With the increase in potential on the conductor, brush discharges occur which increase the effective electrostatic capacity and dissipate the charge so that it is highly advantageous to raise the flashing potential between conductor and ground, even though a ground conductor is used for absorption, as it increases the effectiveness of this conductor.

Figure 3:
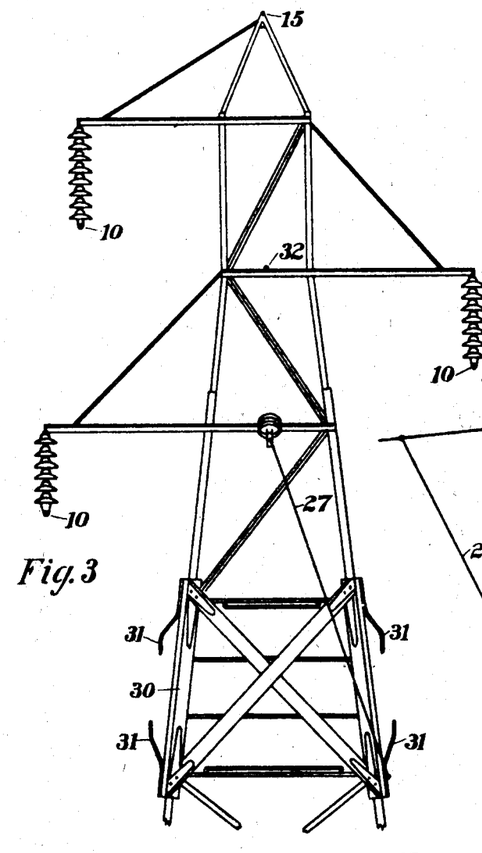
Figs. 3 and 4 are views similar to Figs. 1 and 2 respectively but showing the invention applied to a skeleton tower construction.
Figure 4:
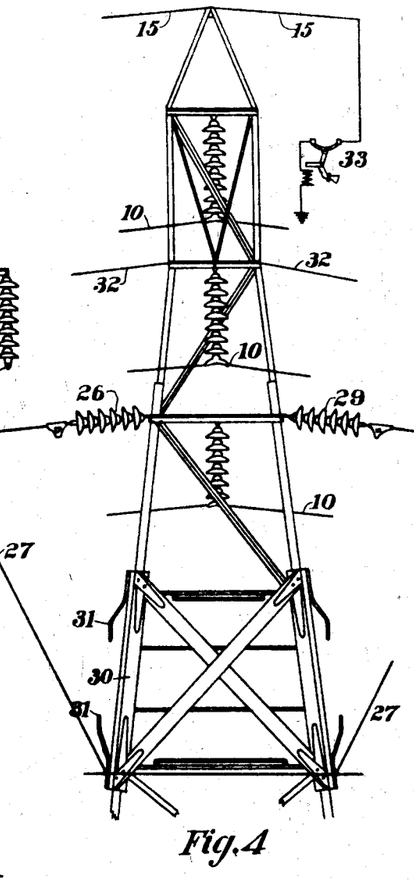

Figs. 3 and 4 show an application of the improved method of construction applied to a steel tower. In order to provide an insulating section between the conductor supports and ground, an insulating section 30 replaces a steel section of the tower. The ends of this section may be provided with discharge horns 31 which tend to shield the wood or insulating members and also tend to keep an arc free of the insulating members should an unusually heavy discharge of lightning cause an arc to ground across the discharge members 31. These members, if properly applied, prevent the shattering of the insulating members due to an abnormally high stress, even though a discharge takes place between the members. An additional charging wire may be placed lower down on the tower as at 32. A tower may be charged by one or more wires or in favorable cases by the release of a bound charge on the tower itself. The charging wire extending over a considerable section of the line, however, has the advantage in that it may be used to facilitate operation of relays used in clearing the line and to prevent burning of the members of the insulated zone 30 or the insulating sections shown in other types of construction.

The charging wire 15 may be provided with a circuit breaker 33 which will clear the line in case an arc occurs between conductors and the insulated section. The circuit breaker may be replaced by a magazine fuse attached if so desired as in Fig. 5. One or all of the fuse arrangements may be used in place of the circuit breaker 33 or for different sections of the line. The high tension fuse 34 is shown in series with a resistance 35 which latter has a shunting gap 36, the lower end being connected to ground.

If sections of the charging wire 15 are left out periodically to reduce the amount of charging current in case of an arc between conductor and tower top, it is evident that a circuit breaker or a fuse at the end of the line may not function, as the charging current will maintain the arc, even though a circuit breaker or fuse operates. If, however, the combination fuse 34 and resistance 35 is used to connect various insulated sections to ground, the conditions will be the same as where the charging conductor is continuous except in the case of relay operation. The smaller amount of charging current with the shorter sections of line connected by the charging wire may be cleared of an arc between conductor and the insulated section by the operation of the fuse, as the charging current of the smaller section may not be sufficient to maintain an arc once the fuse is blown. Several fuses may be used to form multiple paths in case discharges occur before fuse 34 can be replaced. Fuses 37 and 38 are such fuses and come into operation when the gaps 39 and 40 are arced by a high voltage. Since the gaps used in series with the fuses are of different lengths, the shorter one will take a discharge and protect the other ones. After the fuse connected to this gap has cleared the line, the fuse having the next larger gap will take the next discharge sufficient to arc to ground. These fuses may be located at the end of the line, at each section, or at individual structures as desired. When located at individual structures, the gap and fuse must of necessity bridge the insulating section of the structure to work effectively.

Where the charging conductor 15 or 33 is not used, the resistance 35 should be relatively high at the tower so that the potential of the insulated section of the tower will rise together with the conductor upon the release of a bound charge and not escape too quickly through the resistance. This resistance may run from several thousands ohms to several hundred thousands ohms and still prevent burning of the insulated section due to unbalanced currents. The resistance may be in any suitable form, preferably one which needs little care and attention and one which will have a long life under operating conditions. Insulating rods of graphite, carborundum, or any suitable combination of weather protecting tubes packed with a resistance composition or filled with a high resistance fluid may be used for the purpose. The resistance members should preferably be long enough so that they will not flash over at an unnecessarily low voltage and they should also be such that they will not be readily destroyed, although they can still be effective, even though they would be destroyed by a single discharge, as discharges seldom occur twice in succession at the same point, except after considerable interval of time which would permit replacing a damaged member.

Figure 6:
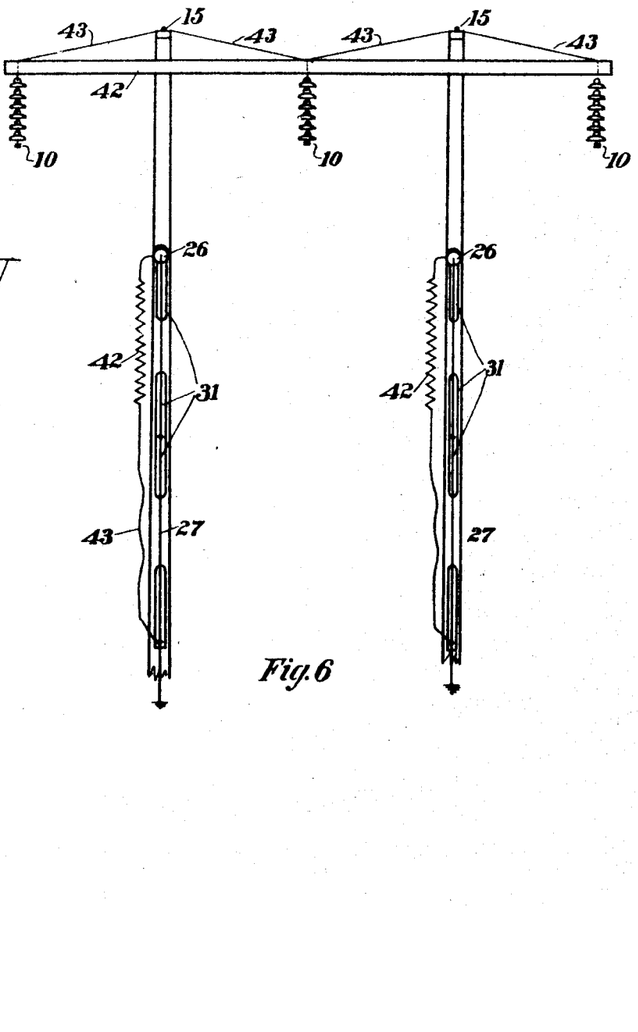
Figs. 6 and 7 are views similar to Figs. 1 and 2 showing another embodiment of the invention.
Figure 7:
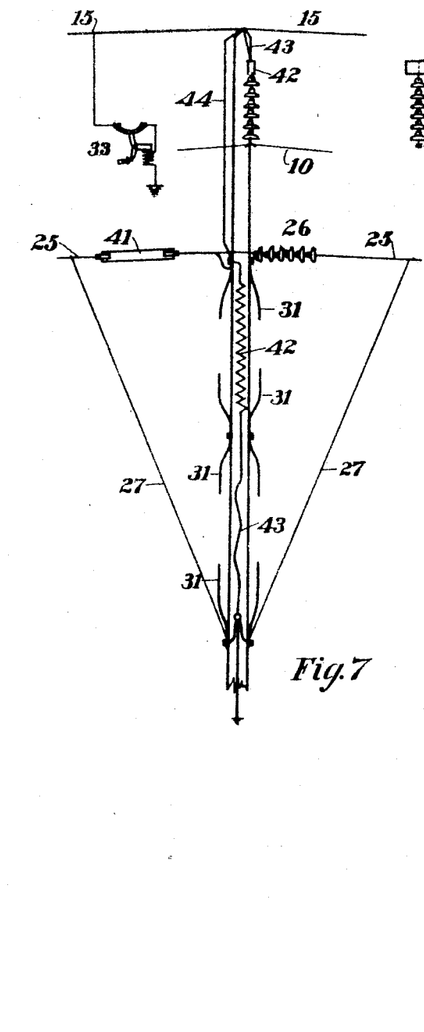

Fig. 6 shows another form of the improved construction of which Fig. 7 is a side elevation. In Figs. 6 and 7 one of the insulators providing insulation for the ground or earth wire 25 is shown as an ordinary suspension insulator 26 and the insulator is made of a piece of wood or fibre 41 in the other case. These insulators should be of suitable length in order to provide sufficient insulation to prevent flashing over the insulating zone between their point of support and ground. The construction in Figs. 6 and 7 shows the insulators mounted on wood cross arms 42. The insulator supports are connected electrically to the charging wires 15 by jumpers 43. In some cases these members may be used for suitable tension members for increasing the strength of the cross arm. In favorable cases they may be omitted entirely. This is particularly true where the cross arms are made of steel, as no bonding is necessary. The insulated section may be protected from shattering by horns or screens 31 and from burning by resistance members 42 and a fuse 43, as previously described. This method of protection is applicable where the charging wire 15 is eliminated or is not carried to ground through its own resistance or reactance at the end of the line. Where the resistance 42 is high and it is not necessary to develop an exceedingly high potential in a supporting structure, the upper insulating zone may be jumpered by a conductor 44. The resistance 42 must of necessity be high in this case, otherwise the charge will flow to ground and the full induced potential between conductor and ground must be carried by the insulator following the release of a bound charge. Should a discharge take place followed by a power arc, the fuse 43 will usually clear the line and restore normal operation. This method of protection is particularly applicable where the line is broken up into sections in order to keep down the charging current between conductor and charging wires 15 so that the arc may be cleared upon interruption of the path to ground by the blowing of the fuse 43 or the opening of a circuit breaker if placed between the charging wire 15 and ground as shown in Fig. 4.

Figure 8:
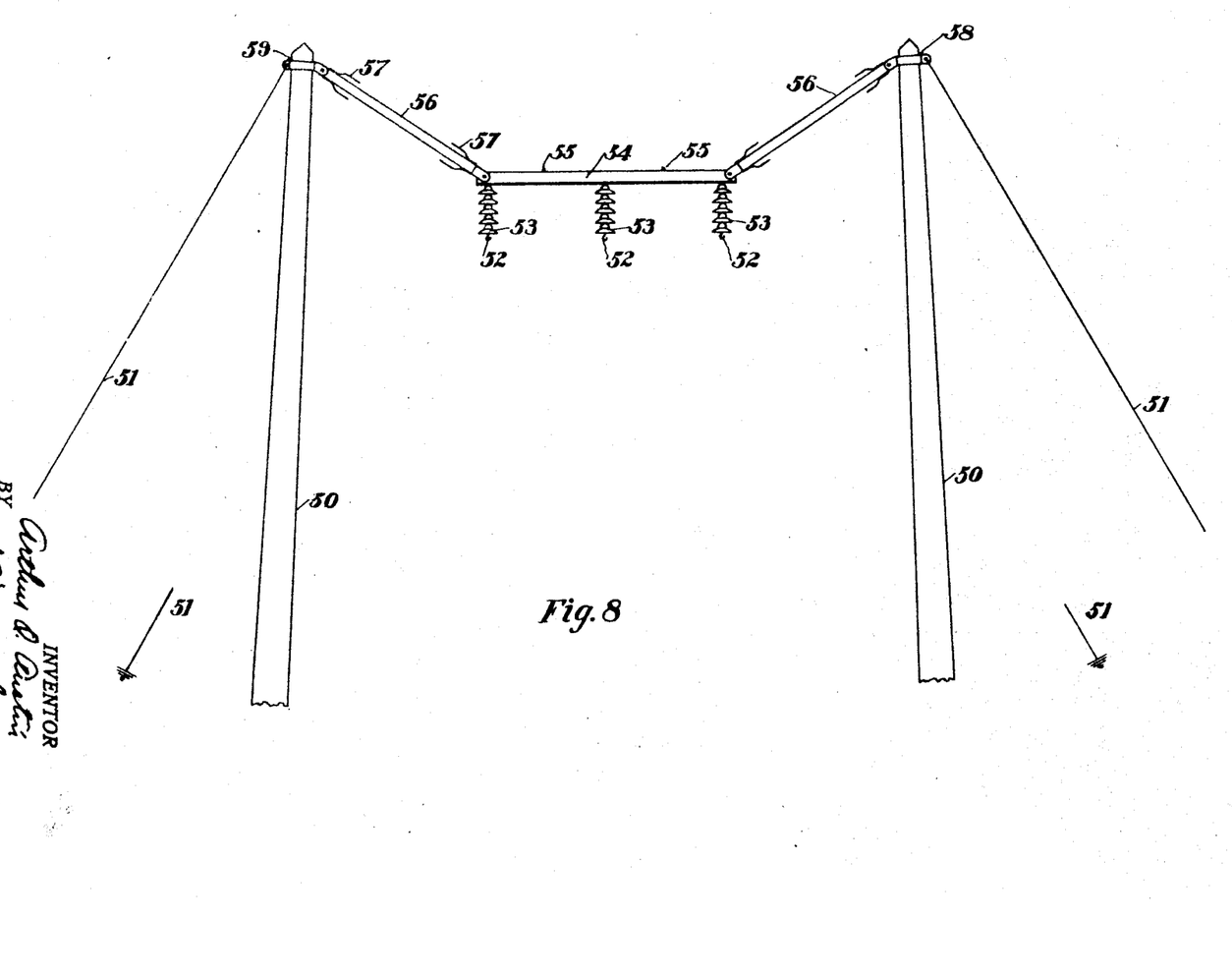
Figs. 8, 9, and 10 are elevations of other forms of the invention.

Fig. 8 shows another form of the invention in which the supporting structure may have wood or steel members 50. These members may be self supporting or guyed by members 51. The power conductors 52 are supported from insulators 53, which in turn are hung from a member 54. This member 54 is preferably of steel and is equipped with charging wires 55 as previously described. The member 54 is suspended by insulators 56 which are protected by discharge members 57. If desired, ground or earth wires may be mounted at 58 and 59. With the arrangement shown, comparatively small insulators may be used for high effective potential between conductors and ground so that arcing will not take place. Where the supporting members 50 are of wood and there is considerable clearance between the guys 51, the power conductors 52 may be comparatively close together and still develop an effective high arcing voltage from conductor to ground for lightning disturbances. The charging wire 55 will tend to prevent the burning of the wood members 56. Where it is desired to reduce the potential on the conductors so as to provide a further factor of safety, ground wires 58 and 59 may be installed. These are connected to ground through the guys 51. This arrangement permits of considerable flexibility so that a break in the conductor, or wind pressure, will not set up undue stresses. This type of construction also makes it possible to place the power conductors quite close together, thereby cutting down the reactance and increasing the amount of power which may be transmitted over the circuit. Any number of conductors may be supported within reasonable mechanical limitations.

Figure 9:
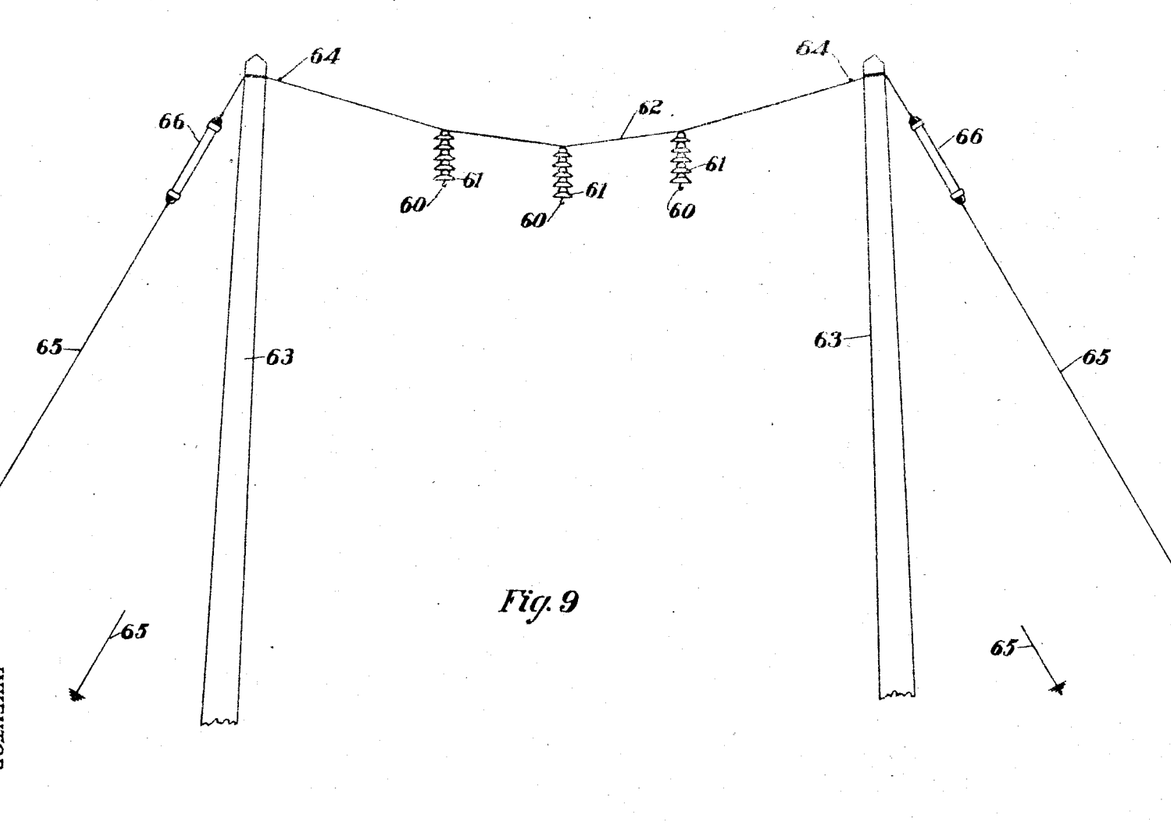

A slightly different type of construction is shown in Fig. 9. In this instance, the power conductors 60 are supported by insulators 61, which in turn are suspended from a cable 62 which is attached to the tops of masts or poles 63. Charging wires 64 are used to prevent burning of the poles and to function in other ways as previously described. The charging wires 64 may be utilized to brace or strengthen the supports longitudinally of the line. Where it is necessary to guy the structure with members 65, it is necessary to insert insulators 66 in order that the charging wire may become effective. This makes it possible to utilize the insulation in the poles 63.

Figures 10, 11:
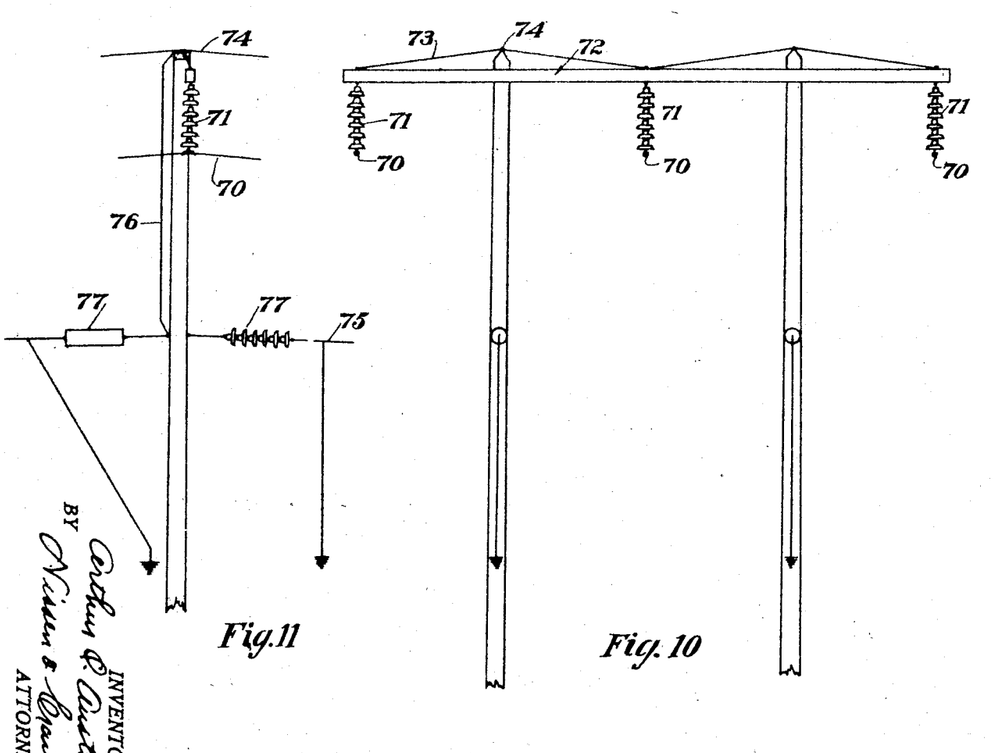
Fig. 11 is an end elevation of the structure shown in Fig. 10.
Figure 12:
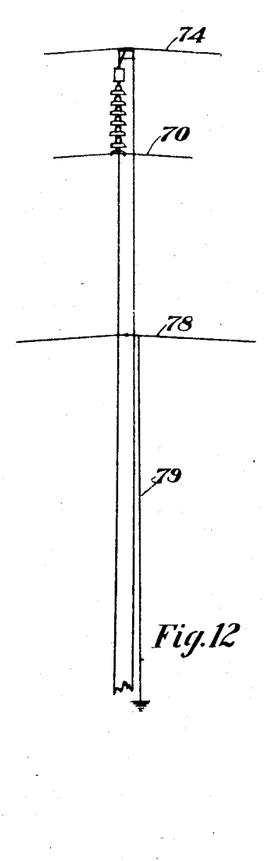
Fig. 12 is an elevation showing another arrangement.

Fig. 10 shows a slightly different construction in which the power conductors 70 are supported by insulators 71, which in turn are supported by a truss member 72, truss rods 73 forming a bond between the upper ends of the insulators 71. The charging wires 74 are connected to the truss member 73. The insulation of the pole is preferably not eliminated or reduced. The method of applying a ground wire 75 is shown, which makes this possible. The ground wire is located below the power conductor at such a distance that the separation between the power conductor 70 and the ground wire 75, will provide the desired insulation. Where ample insulation exists, a jumper 76 may extend from the charging wire to the point of attachment of the insulators 77. Where the ground wire is installed at 78 and a grounding lead 79 is carried down on the pole, the jumper 76 must, of necessity, be omitted.

I claim:

1. In combination a support having a portion thereof insulated from ground, a transmission line mounted on said portion and insulated therefrom, a charging line electrically connected with said portion and grounded at a distance from said support and an insulated ground wire mounted on said support adjacent said transmission line.

2. In combination a support having a metallic portion insulated from ground, a transmission line mounted adjacent said metallic portion but insulated therefrom, a charging line electrically connected with said metallic portion and extending through the same region as said transmission line for charging said metallic portion similarly to charges resulting in said transmission line from external disturbances and for dissipating said charges concurrently with the dissipation of the charges from said line and a ground line mounted adjacent said transmission line and insulated from said support and transmission line but connected to ground adjacent said support.

3. In combination a support having a metallic portion insulated from ground, a transmission line mounted on said metallic portion but insulated therefrom, a charging conductor electrically connected with said metallic portion and extending through the same region as said transmission line and acting to reduce bound charges on said transmission line and to submit the insulated portion of said support to similar charges as said transmission line, said charging conductor being connected through an overload cut-out to ground at a distance from said support.

4. In combination, a support having a metallic portion insulated from ground, a transmission line mounted on said metallic portion but insulated therefrom, a charging conductor electrically connected with said metallic portion and extending through the same region as said transmission line and acting to reduce bound charges on said transmission line and to submit the insulated portion of said support to similar charges as said transmission line, said charging conductor being connected through a relay to ground at a distance from said support.

5. The combination of a support having a conductor section insulated from ground, a transmission line mounted on said insulated section and insulated therefrom, a charging conductor electrically connected with said insulated section for reducing bound charges in said transmission line and for charging the insulated section of said support, said charging conductor being connected to ground through a conductor subjected to conditions suitable to give approximately the same rate of dissipation of charge from the insulated portion of said transmission line adjacent said support, and a ground wire mounted on the support and insulated from the support and transmission line and connected to ground adjacent said support for increasing the electrostatic capacity to ground of said transmission line.

6. The combination of a wood support having metallic members mounted thereon and insulated by said support from ground, a transmission line mounted on said support adjacent said metallic members and insulated therefrom, a charging conductor electrically connected with said metallic members and having connection to ground subject to conditions suitable to give approximately the same rate of dissipation of charges from said metallic members as from the portion of said transmission line adjacent thereto, and a grounded conductor adjacent said transmission line for cooperating with charging conductor to decrease bound charges on said transmission line and to increase the electrostatic capacity to ground of said transmission line.

7. In a transmission line system a supporting structure having a wooden cross arm, a line conductor and means for supporting the same including a metallic bolt carried by said cross arm, an arcing horn detachably connected to said bolt and a second arcing horn supported on said structure and connected to ground and in spaced relation to said first named horn, the adjacent portions of said horns being spaced apart so that the insulating value of the air gap separating the same is less than that of said supporting structure.

8. In a supporting structure for transmission lines including a wooden cross arm, a string of insulators mounted thereon by means of a metallic connector and arcing horn adapted to be detachably connected to one end of said metallic connector, a brace for said cross arm connected to ground and another arcing horn electrically connected to said brace and spaced from said first named horn.

9. In a transmission line system a supporting structure having a wooden cross arm, a line conductor and means for supporting the same including a metallic member carried by said cross arm, an arcing horn electrically connected to said metallic member, and a second arcing horn electrically connected to ground and in spaced relation to said first-named horn, the adjacent portions of said horns being spaced apart so that the insulating value of the air gap separating the same is less than that of said supporting structure.

10. In a transmission line system, a supporting structure having a wooden cross arm, a transmission line and means for supporting the transmission line including a metallic member carried by said cross arm, an arcing horn electrically connected to said metallic member, a second arcing horn supported on said structure and electrically connected to ground and in spaced relation to said first-named horn, the adjacent portions of said horns being spaced apart so that the insulating value of the air gap separating the same is less than that of the supporting structure separating the two horns, and a charging wire electrically connected with said metallic member.

In testimony whereof I have signed my name to this specification on this 21st day of May, A. D. 1927.

ARTHUR O. AUSTIN.